May 10, 1932.   C. M. BRENNER   1,858,136
COUPLING
Filed March 27, 1931
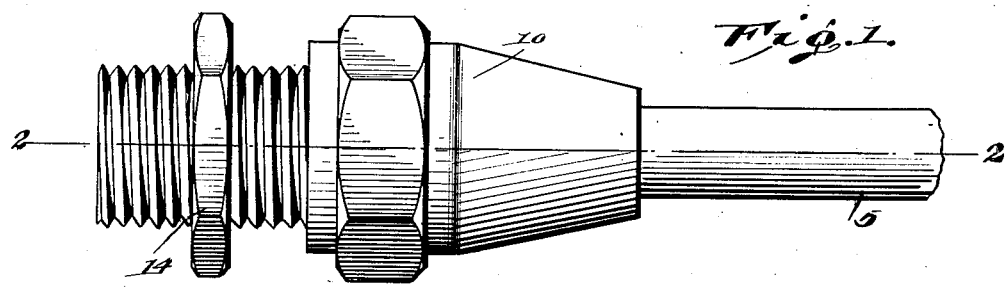
Fig. 1.
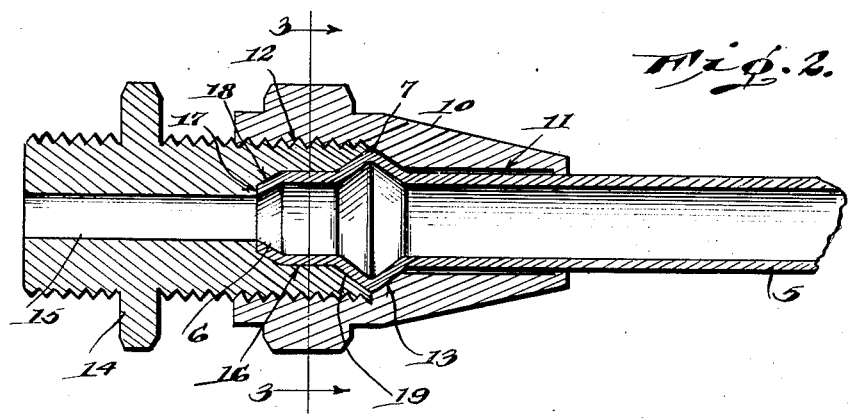
Fig. 2.
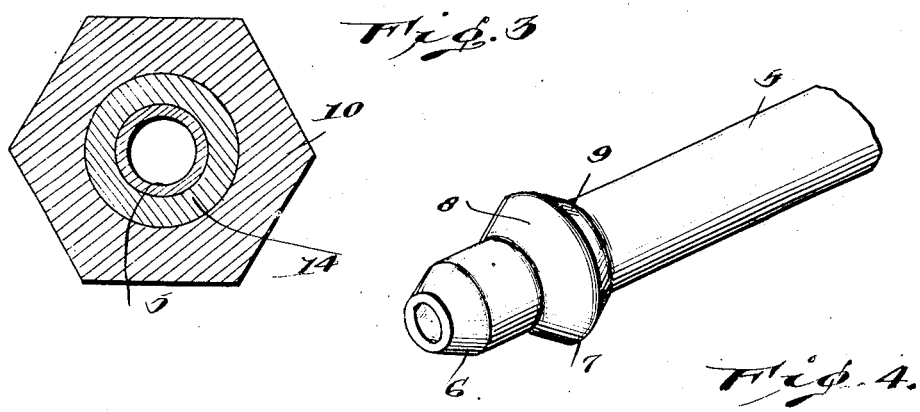
Fig. 3.
Fig. 4.
WITNESS
INVENTOR
C. M. Brenner,
BY
ATTORNEY Patented May 10, 1932

1,858,136

UNITED STATES PATENT OFFICE

CHARLES M. BRENNER, OF SHREVEPORT, LOUISIANA, ASSIGNOR TO ALPHONSE BRENNER COMPANY, INC., OF SHREVEPORT, LOUISIANA, A CORPORATION OF LOUISIANA

COUPLING

Application filed March 27, 1931. Serial No. 525,847.

My invention relates to couplings and joints for pipes or tubes.

An object of the invention is to provide a coupling or joint for making an absolutely leak proof connection for handling oil, gas, water, air or other liquids.

Another object is to provide a connection having a triple seal and one which will not require any packing washers or the like.

A further object is to provide specially formed fittings which will cooperate with a special end formed on the pipe or tube to form the connection.

A still further object of the invention is to provide a connection which will be equally effective and well adapted both to connecting pipes to fittings as well as joining two lengths of pipe or tube together.

Other important objects and advantages will become apparent during the course of the following detailed description when read in conjunction with the accompanying drawings, which form a part of this specification and in which;

Figure 1 is a side elevation of an embodiment of the invention;

Fig. 2 is a sectional view taken on the line 2—2 of Fig. 1;

Fig. 3 is a sectional view taken on the line 3—3 of Fig. 2; and

Fig. 4 is a perspective view of the end of the pipe or tube formed in accordance with the invention.

Referring now to the drawings in detail, wherein like numerals refer to like parts throughout the same, 5 indicates a pipe or tube, preferably made of brass, copper or other suitable metal. The pipe 5 is formed with a tapered end 6 and is formed with a V-shaped enlargement or annular bead 7 a short distance from said tapered end. The enlargement 7 produces two inclined shoulders or bearing faces 8 and 9 respectively for a purpose to be presently seen.

A female coupling nut 10 is received on the pipe 5, prior to the forming of the annular enlarged portion 7. This coupling nut or member 10 has one end portion of the bore thereof, as at 11, sized to fit the external diameter of the pipe 5 and has the other end portion of the bore enlarged and interiorly screw threaded, as at 12. The bore 12 is of a size to fit over the portion 7. An inclined or tapered shoulder 13 is formed between the bore sections 11 and 12, the shoulder having the same inclination as the face 9 on the enlarged annular portion 7.

A male coupling member 14, which may be formed with or attached to a fitting (not shown), is externally threaded for engagement within the bore 12. The male coupling member 14 is provided with a bore 15 which extends therethrough and which is approximately the same size as the opening at the tapered end of the pipe 5. The bore 15 is enlarged at one end as at 16 for the reception of the end of the pipe 5 and is formed with a shoulder 17 and an inclined or tapered seat 18 sized to fit the end of the pipe and the tapered portion 5 respectively. The enlarged portion 16 of the bore is sized to accurately fit the external diameter of the pipe 5 between the annular enlarged portion 7 and the tapered end thereof and the outer end of the bore 16 is outwardly flared or tapered as at 19 to correspond with the inclined face 8.

It will thus be seen that there is in effect a socket formed in the end of the coupling 14, formed to accurately conform to the shape of the end of the pipe 5.

In the operation of assembling the coupling unit the nut 10 is disposed adjacent the end of the pipe 5 and with the end of the pipe formed as shown and described, when the male coupling element is tightened or screwed into the nut 10 or when the nut 10 is tightened on the coupling 14, the pipe or tube 5 is forced into the socket formed by the enlarged bore 16 in the end of the coupling 14, forming a tight joint between the seat 18 and the tapered end 6 before the annular bead 7 is compressed between the shoulders 19 and 13. Compression of the part 7 between said shoulders produces a tight seal between the surface 19 and 8, and 13 and 9.

From the foregoing it will be seen that I have provided a coupling which embodies a triple seal without the use of packing elements. The coupling is well adapted for attaching tubes and pipes to fittings or in end to end relation and if desired the coupling portion 14 could be made integral with a fitting such as a valve, faucet or the like.

I claim:

In combination, a coupling member having a bore extending therethrough, said bore being enlarged at one end and formed to produce a socket having an inclined bearing face at the inner terminus thereof, the outer end of said socket being flared to produce an inwardly inclined shoulder, a nut element threadedly engaged with said coupling member and having an inclined shoulder opposed to said end, a tube having one end fitted into said socket and having said end tapered to produce a conical bearing face for engagement with the inclined bearing face at the inner terminus of said socket, said tube being formed with an annular enlargement adjacent said end, said enlargement being engaged on either side by said inclined shoulders and said tapered end of said tube being forced into engagement with the bearing face at the inner end of said socket when said nut is tightened on said coupling member.

CHARLES M. BRENNER.